United States Patent [19]

Ogata

[11] Patent Number: 4,859,380
[45] Date of Patent: Aug. 22, 1989

[54] METHOD AND APPARATUS FOR PRODUCING FIBER-REINFORCED RUBBER HOSE

[75] Inventor: Kazuhiro Ogata, Komaki, Japan

[73] Assignee: Tokai Rubber Industries, Ltd., Japan

[21] Appl. No.: 145,412

[22] Filed: Jan. 19, 1988

[30] Foreign Application Priority Data

Jan. 23, 1987 [JP] Japan .................................. 62-13782

[51] Int. Cl.⁴ .............................................. B29C 47/28
[52] U.S. Cl. ...................................... 264/25; 156/149; 156/244.14; 156/244.17; 156/382; 264/37; 264/102; 264/173; 264/236; 264/237; 264/317; 425/113; 425/174.4; 425/174.8 R
[58] Field of Search ................. 264/25, 237, 174, 317, 264/37, 102, 173, 511; 425/174.8 R, 113, 114, 174.4; 156/244.13, 149, 244.14, 500, 244.23, 382

[56] References Cited

U.S. PATENT DOCUMENTS

| | | | |
|---|---|---|---|
| 3,049,762 | 8/1962 | Jackson | 425/114 |
| 3,883,384 | 5/1975 | Hopkins | 264/173 |
| 4,444,700 | 4/1984 | Fondren | 425/174.8 R |
| 4,702,867 | 10/1987 | Sejimo et al. | 264/25 |

FOREIGN PATENT DOCUMENTS

| | | | |
|---|---|---|---|
| 52-128978 | 10/1977 | Japan . | |
| 55-144140 | 11/1980 | Japan | 425/174.8 R |
| 57-98337 | 6/1982 | Japan | 264/347 |
| 59-02829 | 1/1984 | Japan | 264/209.6 |
| 59-96936 | 6/1984 | Japan | 425/174.8 R |

*Primary Examiner*—Jeffery Thurlow
*Attorney, Agent, or Firm*—Oliff & Berridge

[57] ABSTRACT

Method and apparatus for producing a fiber-reinforced rubber hose having an inner rubber tube, a tubular reinforcing fiber layer, an outer rubber tube, and a resin cover tube, which are formed in this order on a core mandrel. After the formed cover tube is cooled to a temperature sufficiently low to harden the resin to an extent that substantially inhibits expansion of the outer rubber tube in the hardened cover tube, the unvulcanized inner and outer rubber tubes are microwave-heated to soften the rubber tubes, and to cause a thermal shrinkage of the tubular reinforcing fiber layer, for thereby causing a portion of the inner rubber tube to be forced through a network of an interlaced structure of the reinforcing fiber layer into the outer rubber tube. After the unvulcanized inner and outer rubber tubes are vulcanized, the resin cover tube is removed, and the fiber-reinforced rubber hose is prepared.

12 Claims, 3 Drawing Sheets

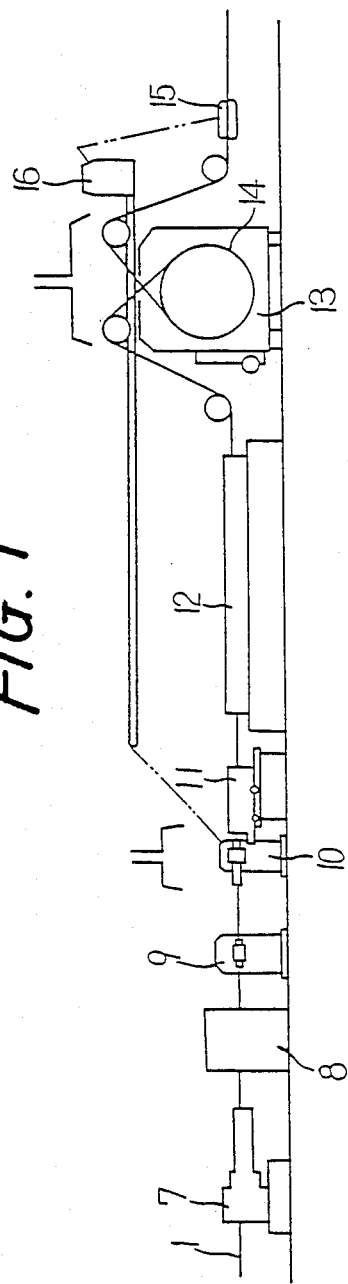
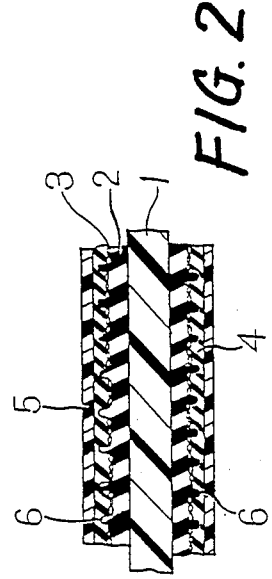

METHOD AND APPARATUS FOR PRODUCING FIBER-REINFORCED RUBBER HOSE

BACKGROUND OF THE INVENTION

1. Field of the Invention

The present invention relates to a method and an apparatus for producing a rubber hose reinforced with fiber yarn or cord, and more particularly to improved method and apparatus suitable for producing such a fiber-reinforced rubber hose which has an improved bonding strength between the reinforcing fiber layer and inner and outer rubber layers or tubes.

2. Discussion of the Prior Art

In the art of producing a rubber hose which does not have a reinforcing fiber or metal layer, it is known to practice a method wherein a microwave heating device is used for internally heating an extruded unvulcanized rubber tube and thereby vulcanizing the unvulcanized rubber material, in an effort to reduce a time required for the vulcanization.

However, the above method suffers from a drawback that the microwave heating of the unvulcanized rubber material is difficult to maintain the temperature of the rubber material within a suitable vulcanizing range. Accordingly, it is necessary to run the extruded unvulcanized rubber tube through a considerably long heating path within the microwave heating device, in order to effect a slow heating of the rubber material. Alternatively, the microwave heating device is turned on and off to effect an intermittent heating operation. In either case, the vulcanization under heat is time-consuming, and the internal structure of the rubber material tends to be excessively vulcanized. Thus, the microwave heating alone is not satisfactory to accomplish the vulcanizing operation in a suitable manner.

On the other hand, dielectric heating by a microwave is not applicable to the production of a rubber hose which has a reinforcing metal layer. Further, the application of the dielectric heating to a rubber hose having a reinforcing fiber layer suffers from a problem. Described more specifically, water or moisture or air contained in the reinforcing fiber layer is vaporized and expanded due to rapid microwave heating thereof, whereby air is trapped at local portions within the unvulcanized rubber material, and at an interface between the rubber material and the reinforcing fiber layer. Consequently, the bonding strength of the fiber layer relative to the rubber layer or tube, and the strength and pressure resistance of the obtained rubber hose are likely to be reduced. Moreover, the air trapped within the rubber hose may significantly deteriorate the appearance and quality of the hose.

Also known is a method as disclosed in German Pat. No. 2715493 (or unexamined published Japanese Patent Application laid open as Publication No. 52-128978), which comprises the steps of: extruding an inner rubber tube on the outer surface of a mandrel made of a metal wire or plastic rod; forming a tubular reinforcing fiber layer made of a nylon or other material, on the outer surface of the inner rubber tube; extruding an outer rubber tube on the outer surface of the reinforcing fiber layer; forming a tubular jacket or cover tube made of a plastic material such as polysulfone, on the outer surface of the outer rubber tube; externally heating the thus-obtained intermediate product by commonly used heating means, to vulcanize the unvulcanized inner and outer rubber tubes; and removing the tubular jacket.

According to the above method, the inner and outer surfaces of the rubber material (inner and outer rubber tubes) are held between the mandrel and the tubular jacket. Therefore, this method eliminates or minimizes air trapping within the hose due to the presence of water or air within the reinforcing fiber layer, and at the same time ensures an intended circular cross sectional shape and a constant thickness of the rubber hose, without employing a conventionally practiced complicated and costly vulcanization technique which employs a continuous sheet of lead. In this respect, the instant method is advantageous.

However, the same method is disadvantageous in that the tubular plastic jacket is first expanded when the intermediate product is subjected to an external heating for vulcanization of the unvulcanized inner and outer rubber tubes. In other words, the tubular jacket is not capable of sufficiently inhibiting expansion of the rubber mass consisting of the inner and outer rubber tubes, during the vulcanization process. As a result, the reinforcing fiber layer of the obtained rubber hose is held merely in contact with the inner and outer rubber tubes, with a very small bonding force between the reinforcing fiber layer and the mating surfaces of the inner and outer rubber tubes. Thus, the obtained rubber hose more or less suffers from a displacement of the inner and outer rubber tubes relative to the reinforcing fiber layer, when the hose is firmly clamped by metal retainers or otherwise pressurized.

In the case where the tubular plastic jacket or cover tube is formed of polysulfone, the obtained rubber hose is difficult to bend, due to relatively high hardness of the polysulfone jacket. If the hose is flattened upon application of an excessive force thereto, the hard plastic jacket prevents the rubber mass from reverting to its original shape. Further, the polysulfone jacket is difficult to remove, at the end of the production process.

SUMMARY OF THE INVENTION

It is therefore a first object of the present invention to provide an improved method by which it is possible to economically and efficiently produce a high-quality fiber-reinforced rubber hose which is substantially free from air trapping due to the presence of water or air within the reinforcing fiber layer during the production process, and wherein the reinforcing fiber layer is securely bonded to the inner and outer rubber tubes.

It is a second object of the present invention to provide an apparatus for economically and efficiently producing such an improved fiber-reinforced rubber hose.

The first object may be attained according to one aspect of the present invention, which provides a method of producing a fiber-reinforced rubber hose, comprising the steps of: extruding an unvulcanized inner rubber tube on an outer surface of a mandrel made of a resin or rubber material; forming a tubular reinforcing fiber layer having an interlaced structure on an outer surface of the inner rubber tube; extruding an unvulcanized outer rubber tube on an outer surface of the reinforcing fiber layer; extruding a cover tube of a resin on an outer surface of the outer rubber tube; cooling the cover tube to a temperature sufficiently low to harden the resin to an extent that substantially inhibits expansion of the outer rubber tube in the hardened cover tube; microwave-heating the unvulcanized inner and outer rubber tubes to soften the rubber tubes, and cause a thermal shrinkage of the tubular reinforcing fiber layer, thereby causing a portion of the inner rubber tube to be forced through a network of the interlaced structure of the reinforcing fiber layer into the outer rubber tube; vulcanizing the unvulcanized inner and outer rubber tubes while externally heating the rubber tubes; and removing the cover tube to expose the outer rubber tube.

In the present method of the invention, the unvulcanized rubber material of the inner and outer rubber tubes within the cover tube is softened by dielectric internal heating by means of a microwave, before the resin or rubber material of the mandrel and the resin of the cover tube are heated and softened. Therefore, the mandrel and the cover tube cooperate with each other to block radial expansion of the softened rubber material. In the meantime, the reinforcing fiber layer heated by microwave heating undergoes radial shrinkage relative to the inner rubber tube, whereby a portion of the inner rubber tube which tends to be expanded is forced through the network of the fiber layer into the still soft outer rubber tube, by an amount corresponding to the radial shrinkage of the fiber layer.

Then, the unvulcanized rubber material of the inner and outer rubber tubes is externally heated for vulcanization in an ordinary manner. As a result, the rubber material including the portion of the inner rubber tube which has been forced through the fiber network radially outwardly into the outer rubber tube is properly cured. Thus, the inner and outer rubber tubes and the reinforcing fiber layer are securely bonded together with a sufficient bonding force, by means of the portion of the rubber material of the inner rubber tube which has been radially outwardly anchored to the material of the outer rubber tube, flowing through the interlaced structure of the reinforcing fiber layer upon radial shrinkage of the fiber layer.

Since the radial expansion of the unvulcanized inner and outer rubber tubes is blocked by the mandrel and the cover tube, these rubber tubes are pressurized by the mandrel and cover tube, whereby water or air possibly present in the reinforcing fiber layer cannot be expanded, and is more likely to be dispersed and less likely to be trapped in certain local portions of the hose. Consequently, the obtained hose provides comparatively increased strength and pressure resistance or fluid tightness. Further, the vulcanization of the rubber material is effected while the rubber mass is held between the relatively hard mandrel and cover tube, the produced hose has a smooth outer surface, a substantially circular cross sectional shape, and a constant thickness.

Moreover, the internal microwave or UHF (ultrahigh frequency) heating, and the ordinary external vulcanization heating are continuously effected, the vulcanization time can be considerably reduced, whereby the overall production efficiency is improved, and the production cost is reduced, even though the rubber hose is reinforced with the fiber layer.

According to the preferred feature of the present method, polymethyl pentene is used as the resin of the cover tube, from the standpoint of hardness and melting point. To prevent softening of the cover tube at a temperature (usually 135° C. to 175° C.) during the microwave-heating step and the following vulcanization heating step, it is particularly preferable to use polymethyl pentene which has a melting point of 240° C. or higher, so that the cover tube is able to sufficiently block the expansion of the rubber material. Such polymethyl pentene is available from Mitsui Sekiyu Kagaku Kogyo Kabushiki Kaisha in Japan, as "TPX" having a melting point of 247° C.

According to another preferred feature of the present method, the cover tube made of a resin, preferably polymethyl pentene, has a wall thickness of 1.5–2.0 mm. If the thickness is smaller than 1.5 mm, the cover tube may crack due to an expanding tendency of the rubber material during the microwave-heating step. If the thickness is larger than 2.0 mm, on the other hand, the heat transfer rate from the cover tube to the rubber material during the vulcanization heating step is lowered, and the required vulcanization time is considerably lengthened, whereby the production cost is significantly increased.

The cover tube as extruded, for example, the polymethyl pentene cover tube as extruded has a temperature of about 270° C., at which the cover tube is too soft to be able to block the expansion of the rubber material in the microwave-heating step. Accordingly, the cover tube is chilled down to a temperature (80°–130° C.) which is low enough to harden the resin to an extent that substantially inhibits the expansion of the rubber material (outer rubber tube, in particular). In the case where the microwave-heating is conducted continuously, it is preferred to positively cool the cover tube. However, it is desired to avoid cooling the cover tube to a temperature below 80° C., since this means an unnecessary amount of loss of the heat which has been applied to the outer rubber tube during the extrusion thereof.

According to another preferred feature of the present method, the unvulcanized inner and outer rubber tubes are microwave-heated to a temperature of 135°–175° C. Below 135° C., there may arise no effective flow of the rubber material from the inner rubber tube toward the outer rubber tube. About 175° C., the fiber of the fiber layer may be deteriorated, or the cover tube tends to be softened.

The vulcanization step may be effected in an ordinary manner, employing a steam bath, a hot-air bath or a salt bath. Preferably, the vulcanization temperature is held within a range of 135°–175° C. Below 135° C., an excessive long time is required to complete the vulcanization. Above 175° C., the reinforcing fiber layer may be deteriorated.

According to a further feature of the present method, an intermediate extruded product which consists of the mandrel, the unvulcanized inner tube and the reinforcing fiber layer, is introduced into a vacuum chamber under a reduced pressure, so that the interlaced structure o f the fiber layer is substantially degassed, before the outer rubber layer is extruded.

According to a still further feature of the method of the present invention, an intermediate extruded product which consists of the mandrel, the inner and outer rubber tubes and the fiber layer, is introduced into a vacuum chamber under a reduced pressure, so that trapping of air between the outer rubber tube and the resin cover tube is substantially prevented, before the cover tube is extruded.

The second object of the present invention may be achieved according to another aspect of the present invention, which provides an apparatus for producing a fiber-reinforced rubber hose, comprising: first extruding means for extruding an unvulcanized inner rubber tube on an outer surface of a mandrel made of a resin or rubber material; forming means for forming a tubular reinforcing fiber layer having an interlaced structure on an outer surface of the inner rubber tube; second extruding means for an unvulcanized outer rubber tube on an outer surface of the reinforcing fiber layer; third extruding means for a cover tube of a resin on an outer surface of the outer rubber tube; means for cooling the cover tube to a temperature sufficiently low to harden the resin to an extend that substantially inhibits expansion of the outer rubber tube in the hardened cover tube; means for microwave-heating the unvulcanized inner and outer rubber tubes to soften the rubber tubes, and cause a thermal shrinkage of the tubular reinforcing fiber layer, thereby causing a portion of the inner rubber tube to be forced through a network of the interlaced structure of the reinforcing fiber layer into the outer rubber tube; means for vulcanizing the unvulcanized inner and outer rubber tubes while externally heating the rubber tubes; and means for removing the cover tube to expose the outer rubber tube.

The instant apparatus for producing a fiber-reinforced rubber hose provides the same advantages as described with the method according to the invention.

According to one feature of the apparatus of the invention, the second extruding means comprises an extruding head which is supplied with a rubber material to extrude the unvulcanized outer rubber tube, and means for defining an enclosed vacuum chamber which is connected to a vacuum source. The apparatus further comprises means for introducing an intermediate extruded product consisting of the mandrel, the unvulcanized inner rubber tube and the reinforcing fiber layer, into the extruding head of the second extruding means through the vacuum chamber, such that the intermediate extruded product is coaxial with the extruding head.

According to another feature of the instant apparatus, the second extruding means comprises an extruding head for extruding the unvulcanized outer rubber tube, and the third extruding means comprises an extruding head for extruding the cover tube. The apparatus further comprises: means for defining an enclosed vacuum chamber which is connected to a vacuum source and which is disposed so as to connect the extruding heads of the second and third extruding means; and means for introducing na intermediate extruded product consisting of the mandrel, the unvulcanized inner and outer rubber tubes and the reinforcing fiber layer, into the extruding head of the third extruding means through the vacuum chamber, such that the intermediate extruded product is coaxial with the extruding head of the third extruding means.

BRIEF DESCRIPTION OF THE DRAWINGS

The above and optional objects, features and advantages of the present invention will be better understood by reading the following description of the presently preferred embodiments of the invention, when considered in conjunction with the accompanying drawings, in which:

FIG. 1 is a schematic side elevational view of one embodiment of an apparatus of the present invention, in the form of a production line for fabricating a fiber-reinforced rubber hose;

FIG. 2 is a fragmentary elevational view in cross section of a rubber hose produced according to a method of the invention practiced on the production line of FIG. 1;

DESCRIPTION OF THE PREFERRED EMBODIMENTS

Figure 3:
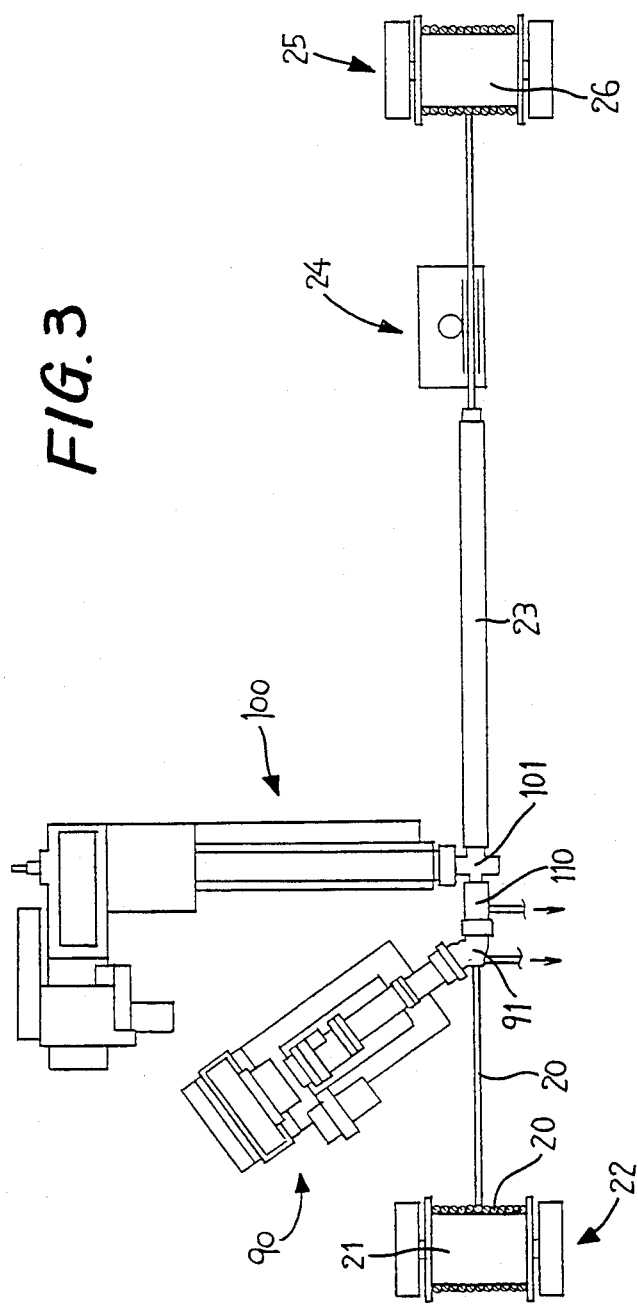
FIG. 3 is an elevational view of a device used in a production line according to another embodiment of the invention.

Referring first to FIG. 1, there is shown a production line by which a fiber-reinforced rubber hose was produced according to a presently preferred method of this invention. The production line includes a first rubber extruder 7, into which a mandrel 1 formed of a suitable resin or rubber material was fed at a rate of 15 m/min. from a feed stand (not shown). While the mandrel 1 was fed through the first rubber extruder 7, an unvulcanized inner rubber tube 2 was continuously extruded on the outer surface of the mandrel 1. The production line further includes a braider 8 form forming a tubular reinforcing fiber layer 3 on the outer surface of the extruded inner rubber tube. The braider 8 may be replaced by any suitable means for forming an interlaced structure of the reinforcing fiber layer 3, which is applied by braiding, circular weaving, two-ply counter directional helical winding, or knitting, by using a suitable heat-shrinkable fiber yarn, such as filament yarn of polyester, nylon, vinylon, etc. The intermediate extruded product consisting of the mandrel 1, inner rubber tube 2 and reinforcing rubber layer 3 was then fed through a second rubber extruder 9, whereby an unvulcanized outer rubber tube 4 was extruded at 90° C. on the outer surface of the tubular fiber layer 3. Successively, the outer surface of the unvulcanized outer rubber tube 4 was covered by a plastic extruder 10, with polymethyl pentene having a melting point of 247° C. This extrusion was effected at 270° C. Thus, a cover tube 5 was formed on the outer rubber tube 4.

Then, the cover tube 5 covering the unvulcanized rubber material 2, 4 was chilled to about 130° C. by a cooling device 11 which follows the plastic extruder 10. Thus, the cover tube was given a suitable degree of hardness of maintaining the shape of the unvulcanized rubber mass. In the next step, the unvulcanized inner and outer rubber tubes 2, 4 were internally heated by a microwave-heating device in the form of a UHF (ultra-high frequency) heating device 12. The thus prepared intermediate product was then continuously introduced into a salt bath 13 equipped with a rotating drum 14. The drum 14 is formed with a helical groove in its outer circumferential surface, so that the intermediate product engaging the helical groove is moved from one end of the groove to the other end while the drum 14 is rotating. In this specific example, the intermediate product was externally heated at 160° C. in an ordinary manner, whereby the unvulcanized rubber material (rubber tubes 2, 4) was vulcanized. Finally, the resin cover tube 5 (formed of polymethyl pentene) was removed by a plastic remover 15, so that the vulcanized outer rubber tube 4 was exposed. The production line includes a plastic crusher 16 which receives the removed resin material and feeds it back to the plastic extruder 10, for reclaiming the resin material used. The thus produced length of the fiber-reinforced rubber hose was wound by a take-up stand (not shown).

In the manner described above, Examples 1 and 2 were prepared in different conditions, and by using different materials for the mandrel 1, inner and outer rubber tubes 2, 4, reinforcing fiber layer 3 and cover tube 5. The operating conditions and the materials used for Examples 1 and 2 are listed in Table 1. As is understood from the table, the members 1-5 of Examples 1 and 2 have different outside diameters (OD in mm).

TABLE 1

|  | EXAMPLE 1 (OD mm) | EXAMPLE 2 (OD mm) |
| --- | --- | --- |
| Mandrel | Polyester (7.15) | Rubber (13.5) |
| Inner rubber tube | Fluorine rubber (10.5) | NBR (17.6) |
| Fiber layer | Vinylon (11.5) | Polyester (19.5) |
| Outer rubber tube | Epichlorohydrin rubber (13.7) | EPDM (22.5) |
| Cover tube | Polymethyl pentene (17.2) | Polymethyl pentene (26.5) |
| UHF heating | 3.2 KW × 1.5 min. | 4.0 KW × 1.5 min. |
| Vulcanization | 160° C. × 45 min | 160° C. × 45 min. |

Comparative examples corresponding to Examples 1 and 2 were prepared, in the same manner, except for the absence of the UHF heating before the vulcanization step. Bonding forces between the reinforcing fiber layer and the inner rubber tube, and between the fiber layer and the outer rubber tube of Examples 1 and 2 and the corresponding comparative examples were measured. The measurements are indicted in Table 2, wherein the bonding forces are expressed in kg/inch.

TABLE 2

|  | Example 1 | | Example 2 | |
| --- | --- | --- | --- | --- |
| UHF Heating | YES | NO | YES | NO |
| Bonding Force | | | | |
| Fiber layer/inner rubber tube | 12-14 | 9-11 | 19-23 | 14-15 |
| Fiber layer/outer rubber tube | 7-9 | 3-4 | 7-8 | 5-6 |

YES: Examples 1 and 2 according to the invention
NO: Comparative Examples corresponding to Examples 1 and 2

It follows from Table 2 that Examples 1 and 2 according to the present invention demonstrated better results, i.e., considerably larger bonding forces between the reinforcing fiber layer 3 and the inner and outer rubber tubes 2, 4, than the corresponding comparative examples.

It will be understood that the cover tubes 5 of Examples 1 and 2 have wall thicknesses of 1.75 mm and 2.0 mm, respectively. Further examples were prepared in the same manner as in Examples 1 and 2, with an exception that the cover tubes 5 have wall thicknesses of 1.0 mm and 2.5 mm. The example with the cover tube 5 having the 1.0 mm thickness suffers from cracking during the UHF heating, while the example with the cover tube 5 having the 2.5 mm thickness required 60 minutes to complete the vulcanization at 160° C.

Figure 4:
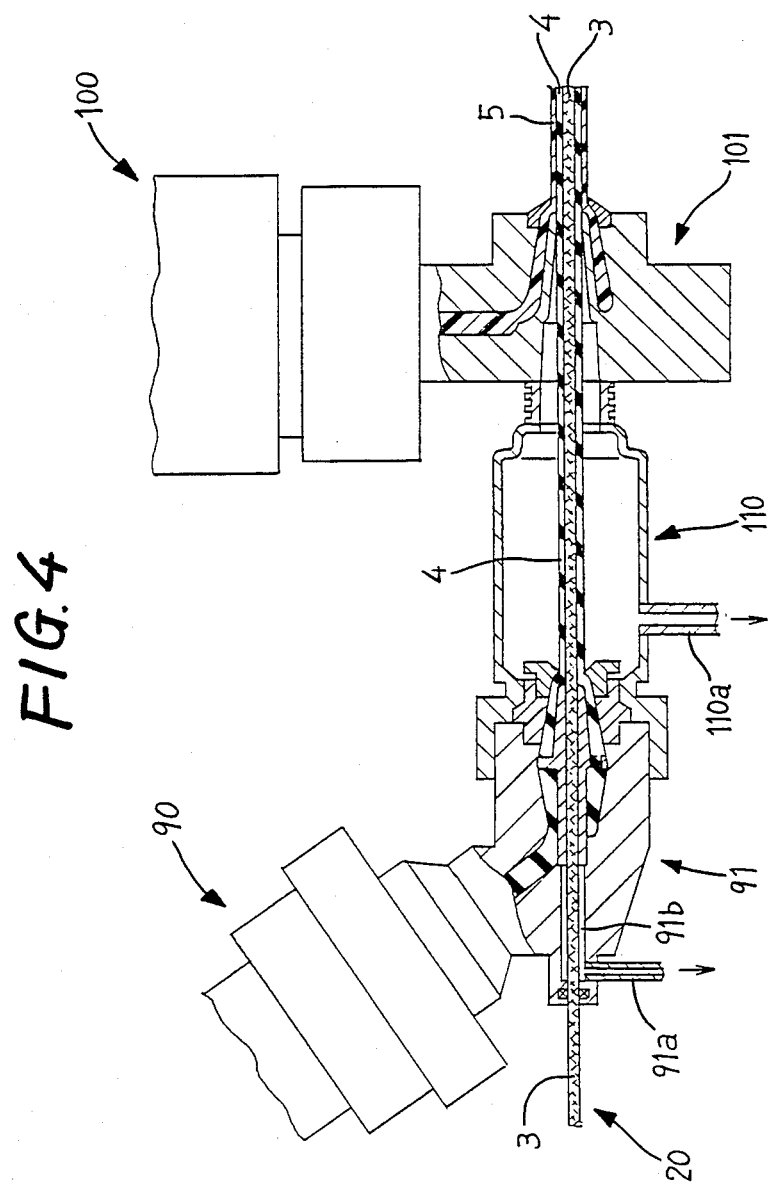
FIG. 4 is a fragmentary elevational view in cross section showing a portion of the device of FIG. 3.

Referring next to FIGS. 3 and 4, a modified embodiment of the present invention will be described. The same reference numerals as used in FIGS. 1 and 2 are used in FIGS. 3 and 4, to identify the corresponding elements.

In the production line of FIGS. 1 and 2, extrusion of the inner rubber tube 2, formation of the reinforcing fiber layer 3, extrusion of the outer rubber tube 4, and extrusion of the cover tube 5, are all conducted in a continuous manner, while the mandrel 1 is fed from the first rubber extruder 7 toward the plastic extruder 10. In the production line of the modified embodiment of FIGS. 3 and 4, however, all the four steps indicated above will not be conducted continuously. That is, an intermediate extruded product 20 consisting of the mandrel 1, inner rubber tube 2 and reinforcing fiber layer 3 is wound on a storage drum 21 which is rotatably supported on a feed stand 22, as shown in FIG. 3. The intermediate product 20 is fed from the rotating storage drum 21 to a second rubber extruder 90 which has an extruding head 91. The product 20 on which the outer rubber tube 4 is formed by the extruding head 91 is then fed through an extruding head 101 of a plastic extruder 100, so that the cover tube 5 is extruded on the outer rubber tube 4.

Described in greater detail referring particularly to FIG. 4, the second rubber extruder 90 has a cylindrical enclosed vacuum chamber 91b coaxial with the extruding head 91. The vacuum chamber 91b is connected to a suitable vacuum source via a suction port 91a, so that the vacuum chamber 91b is held at a reduced pressure, e.g., 320 mmHg. The extruding head 91 of the second rubber extruder 90 is connected to an extruding head 101 of the plastic extruder 100, by means of an enclosed vacuum chamber 110 in the form of a comparatively large cylindrical housing coaxial with the extruding heads 91 and 101. The vacuum chamber 110 is also connected to a vacuum source via a suction port 110a, so that the chamber 110 is held at a reduced pressure, e. g., 300 mmHg.

In the above arrangement, the reinforcing fiber layer 3 may be suitably degassed while the product 20 is passed through the vacuum chamber 91b leading to the extruding head 91 of the second rubber extruder 90, before the outer rubber tube 4 is extruded on the fiber layer 3. Further, the trapping of air between the outer rubber tube 4 and the cover tube 5 may be avoided, by passing the tube 4 passed through the vacuum chamber 110 leading to the extruding head 101 of the plastic extruder 100, before the cover tube 5 is formed on the outer rubber tube 4. Thus, otherwise possible air trapping within the fiber layer 3 and/or between the tube 4 and 5 can be avoided.

The intermediate product on which the cover tube 5 has been formed is then fed through a cooling device 23, so that the polymethyl pentene or other resin material of the cover tube 5 is hardened to an extent that substantially inhibits radially outward expansion of the outer rubber tube 4 during the subsequent microwave heating. The cooled intermediate product is then passed through a feed device 24, and wound on a storage drum 25 on a take-up device 26. The feed device 24 and the take-up device 26 serve as means for feeding the intermediate product 20 through the vacuum chamber 91b, extruding head 91, vacuum chamber 110, extruding head 101 and cooling device 23. The intermediate product wound on the storage drum 26 is then fed to a suitable microwave heating device such as the UHF heating device 12 as used in the preceding embodiment, and is then subjected to a vulcanizing operation, and an operation to remove the cover tube 5.

While the present invention has been described in its presently preferred embodiments, it is to be understood that the invention is not limited to the precise details of the illustrated embodiments, but may be embodied with various changes, modifications and improvements, which may occur to those skilled in the art, without departing from the spirit and scope of the invention defined in the appended claims.

For instance, the inner or outer rubber tube 2, 4 which consists of a single tubular layer may be replaced by a multi-ply rubber tube which consists of a plurality of laminar layers. For example, the inner rubber tube may consist of a fluorine rubber layer and an epichlorohydrin rubber layer which are simultaneously extruded, in coaxial relation with each other.

What is claimed is:

1. A method of producing a fiber-reinforced rubber hose, comprising the steps of:
   extruding an unvulcanized inner rubber tube on an outer surface of a mandrel made of a resin or rubber material;
   forming a tubular reinforcing fiber layer having an interlaced structure on an outer surface of said inner rubber tube;
   extruding an unvulcanized outer rubber tube on an outer surface of said reinforcing fiber layer, at one of opposite ends of an enclosed vacuum chamber under a reduced pressure;
   continuously feeding an intermediate extruded product consisting of said mandrel, said unvulcanized inner and outer rubber tubes and said reinforcing fiber layer, through said enclosed vacuum chamber;
   extruding a cover tube of a resin on an outer surface of said outer rubber tube of said intermediate extruded product, at the other end of said enclosed vacuum chamber;
   cooling said cover tube to a temperature sufficiently low to harden said resin to an extent that substantially inhibits expansion of said outer rubber tube in the hardened cover tube;
   microwave-heating said unvulcanized inner and outer rubber tubes to soften said rubber tubes, and cause a thermal shrinkage of said tubular reinforcing fiber layer, thereby causing a portion of said inner rubber tube to be forced through a network of said interlaced structure of said reinforcing fiber layer into said outer rubber tube;
   vulcanizing said unvulcanized inner and outer rubber tubes while externally heating said rubber tubes; and
   removing said cover tube to expose said outer rubber tube.

2. A method of producing a fiber-reinforced rubber hose according to claim 1, wherein said extruded cover tube is positively cooled.

3. A method of producing a fiber-reinforced rubber hose according to claim 1, wherein said resin of said cover tube consists of polymethyl pentene.

4. A method of producing a fiber-reinforced rubber hose according to claim 3, wherein said cover tube consisting of polymethyl pentene has a thickness of 1.5–2.0 mm.

5. A method of producing a fiber-reinforced rubber hose according to claim 1, wherein said extruded cover tube is cooled to a temperature of 80°–130° C.

6. A method of producing a fiber-reinforced rubber hose according to claim 1, wherein said unvulcanized inner and outer tubes are microwave-heated to an vulcanized at a temperature of 135°–175° C.

7. A method of producing a fiber-reinforced rubber hose according to claim 1, further comprising a step of introducing an intermediate extruded product consisting of said mandrel, said unvulcanized inner rubber tube and said tubular reinforcing fiber layer, into a vacuum chamber under a reduced pressure, so as to substantially degas said interlaced structure of said reinforcing fiber layer, before said unvulcanized outer rubber layer is extruded.

8. An apparatus for producing a fiber reinforced rubber hose, comprising:
   first extruding means for extruding an unvulcanized inner rubber tube on an outer surface of a mandrel made of a resin or rubber material;
   forming means for forming a tubular reinforcing fiber layer having an interlaced structure on an outer surface of said inner rubber tube;
   second extruding means including an extruding head for extruding an unvulcanized outer rubber tube on an outer surface of said reinforcing fiber layer;
   third extruding means including an extruding head for extruding a cover tube of a resin on an outer surface of said outer rubber tube;
   means for defining an enclosed vacuum chamber which is connected to a vacuum source and which is disposed so as to connect said extruding heads of said second and third extruding means;
   means for cooling said cover tube to a temperature sufficiently low to harden said resin to an extent that substantially inhibits expansion of said outer rubber tube in the hardened cover tube;
   means for microwave-heating said unvulcanized inner and outer rubber tubes to soften said rubber tubes, and cause a thermal shrinkage of said tubular reinforcing fiber layer, thereby causing a portion of said inner rubber tube to be forced through a network of said interlaced structure of said reinforcing fiber layer into said outer rubber tube;
   means for vulcanizing said unvulcanized inner and outer rubber tubes while externally heating said rubber tubes; and
   means for removing said cover tube to expose said outer rubber tube.

9. An apparatus for producing a fiber-reinforced rubber hose according to claim 8, wherein said second extruding means comprises means for defining an enclosed vacuum chamber which is connected to a vacuum source, said apparatus further comprising means for introducing an intermediate extruded product consisting of said mandrel, said unvulcanized inner rubber tube and said reinforcing fiber layer, into said extruding head of said second extruding means through said vacuum chamber of said second extruding means, such that said intermediate extruded product is coaxial with said extruding head of said second extruding means.

10. An apparatus for producing a fiber-reinforced rubber hose according to claim 8, further comprising:
    means for introducing an intermediate extruded product consisting of said mandrel, said unvulcanized inner and outer rubber tubes and said reinforcing fiber layer, into said extruding head of said third extruding means through said vacuum chamber, such that said intermediate extruded product is coaxial with said extruding head of said third extruding means.

11. A method of producing a fiber-reinforced rubber hose, comprising the steps of:
    extruding an unvulcanized inner rubber tube on an outer surface of a mandrel made of a resin or rubber material;
    forming a tubular reinforcing fiber layer having an interlaced structure on an outer surface of said inner rubber tube;
    extruding an unvulcanized outer rubber tube on an outer surface of said reinforcing fiber layer, at one of opposite ends of an enclosed vacuum chamber under a reduced pressure;
    continuously feeding an intermediate extruded product consisting of said mandrel, said unvulcanized inner and outer rubber tubes and said reinforcing fiber layer, through said enclosed vacuum chamber;

extruding a cover tube of a resin on an outer surface of said outer tube of said intermediate extruded product, at the other end of said enclosed vacuum chamber;

cooling said cover tube to a temperature to harden said resin;

vulcanizing said unvulcanized inner and outer rubber tubes while externally heating said rubber tubes; and removing said cover tube to expose said outer rubber tube.

12. An apparatus for producing a fiber-reinforced rubber hose, comprising:

first extruding means for extruding an unvulcanized inner rubber tube on an outer surface of a mandrel made of a resin or rubber material;

forming means for forming a tubular reinforcing fiber layer having an interlaced structure on an outer surface of said inner rubber tube;

second extruding means including an extruding head for extruding an unvulcanized outer rubber tube on an outer surface of said reinforcing fiber layer;

third extruding means including an extruding head for extruding a cover tube of a resin on an outer surface of said outer rubber tube;

means for defining an enclosed vacuum chamber which is connected to a vacuum source and which is disposed so as to connect said extruding heads of said second and third extruding means;

means for cooling said cover tube to a temperature to harden said resin;

means for vulcanizing said unvulcanized inner and outer rubber tubes while externally heating said rubber tubes; and means for removing said cover tube to expose said outer rubber tube.

* * * * *